(12) United States Patent
Lee et al.

(10) Patent No.: US 9,781,101 B2
(45) Date of Patent: Oct. 3, 2017

(54) METHOD AND APPARATUS FOR CONTROLLING CONNECTION BETWEEN DEVICES

(75) Inventors: Keum-koo Lee, Seongnam-si (KR);
Hee-jeong Choo, Anyang-si (KR);
Ju-yun Sung, Yongin-si (KR)

(73) Assignee: Samsung Electronics Co., Ltd (KR)

(*) Notice: Subject to any disclaimer, the term of this patent is extended or adjusted under 35 U.S.C. 154(b) by 0 days.

(21) Appl. No.: 13/298,832

(22) Filed: Nov. 17, 2011

(65) Prior Publication Data

US 2012/0203919 A1    Aug. 9, 2012

(30) Foreign Application Priority Data

Feb. 9, 2011 (KR) .................. 10-2011-0011612

(51) Int. Cl.
*G06F 15/16* (2006.01)
*H04L 29/06* (2006.01)
*H04L 12/751* (2013.01)
*H04L 29/08* (2006.01)

(52) U.S. Cl.
CPC ............ *H04L 63/083* (2013.01); *H04L 45/02* (2013.01); *H04L 63/0861* (2013.01); *H04L 63/101* (2013.01); *H04L 67/104* (2013.01); *H04L 63/0492* (2013.01)

(58) Field of Classification Search
CPC ............... H04W 84/18; H04W 12/06; H04N 21/43615; H04N 21/43637; H04N 21/4325; H04N 7/17309; H04L 63/0491; H04L 63/08; H04L 67/104; H04L 45/02; A63F 2300/408

USPC ................... 709/227–229; 455/456.1–456.6; 726/2–12

See application file for complete search history.

(56) References Cited

U.S. PATENT DOCUMENTS

| | | | |
|---|---|---|---|
| 7,606,938 B2 * | 10/2009 | Roese et al. ................. | 709/242 |
| 7,742,762 B1 | 6/2010 | Biere et al. | |
| 8,335,472 B2 | 12/2012 | Miyata | |
| 8,355,727 B2 * | 1/2013 | Hoang et al. ................. | 455/444 |
| 8,364,758 B2 * | 1/2013 | Hydrie et al. ................ | 709/204 |
| 8,918,643 B2 | 12/2014 | Okude | |
| 2003/0217151 A1 * | 11/2003 | Roese et al. ................. | 709/225 |
| 2004/0006713 A1 | 1/2004 | Minemura | |
| 2005/0152287 A1 | 7/2005 | Yokomitsu et al. | |

(Continued)

FOREIGN PATENT DOCUMENTS

| | | |
|---|---|---|
| CN | 1456983 | 11/2003 |
| CN | 1829157 | 9/2006 |

(Continued)

OTHER PUBLICATIONS

Japanese Office Action dated May 18, 2015 issued in counterpart application No. 2013-553338.

(Continued)

*Primary Examiner* — Chirag R Patel
(74) *Attorney, Agent, or Firm* — The Farrell Law Firm, P.C.

(57) ABSTRACT

A method and apparatus for controlling connection between devices includes detecting a first device, determining whether the first device is included in a device list, obtaining information related to the first device from a second device, and establishing a connection with the first device based on the information from the second device.

21 Claims, 8 Drawing Sheets

(56) References Cited

U.S. PATENT DOCUMENTS

| | | |
|---|---|---|
| 2005/0169212 A1 | 8/2005 | Doi et al. |
| 2005/0257052 A1 | 11/2005 | Asai et al. |
| 2006/0041612 A1* | 2/2006 | Doshi et al. .................. 709/202 |
| 2006/0171421 A1 | 8/2006 | Matsunaga et al. |
| 2006/0192849 A1 | 8/2006 | Inoue |
| 2006/0218622 A1 | 9/2006 | Kimura |
| 2007/0105500 A1 | 5/2007 | Kim |
| 2007/0141988 A1* | 6/2007 | Kuehnel et al. ............. 455/41.2 |
| 2008/0209034 A1 | 8/2008 | Shin et al. |
| 2009/0265775 A1* | 10/2009 | Wisely et al. .................... 726/9 |
| 2010/0115278 A1 | 5/2010 | Shen et al. |
| 2011/0023097 A1* | 1/2011 | McDiarmid et al. ............. 726/5 |
| 2011/0080486 A1* | 4/2011 | Yamaguchi ......... H04W 76/023 348/207.1 |

FOREIGN PATENT DOCUMENTS

| | | |
|---|---|---|
| CN | 101816163 | 8/2010 |
| CN | 101855861 | 10/2010 |
| EP | 1 361 494 | 11/2003 |
| JP | 2004-040717 | 2/2004 |
| JP | 2005-323092 | 11/2005 |
| JP | 2007-068035 | 3/2007 |
| JP | 2010-219824 | 9/2010 |
| JP | 2010-268266 | 11/2010 |
| WO | WO 2010/019353 | 2/2010 |

OTHER PUBLICATIONS

Chinese Office Action dated Nov. 4, 2015 issued in counterpart application No. 201180067216.4, 19 pages.
Japanese Office Action dated Mar. 28, 2016 issued in counterpart application No. 2013-553338, 5 pages.
Chinese Office Action dated Jul. 19, 2016 issued in counterpart application No. 201180067216.4, 16 pages.
Chinese Decision of Rejection dated Dec. 5, 2016 issued in counterpart application No. 201180067216.4, 12 pages.
European Search Report dated Mar. 16, 2017 issued in counterpart application No. 11858205.5-1853, 8 pages.

* cited by examiner

METHOD AND APPARATUS FOR CONTROLLING CONNECTION BETWEEN DEVICES

PRIORITY

This application claims priority to Korean Patent Application No. 10-2011-0011612, filed on Feb. 9, 2011, in the Korean Intellectual Property Office, the contents of which are incorporated herein by reference.

BACKGROUND OF THE INVENTION

1. Field of the Invention

The present invention relates generally to a method and apparatus for controlling connection between devices, and more particularly, to a method and apparatus for automatically controlling connection between devices without inputting identification and authentication information.

2. Description of the Related Art

Due to the recent increase in use of the number of products related to a home network, individual accounts are now required to manage private data of each family member used in shared products inside a house, and to connect a device in an external network to a device in an in-house network. However, since an additional text input is used to input an IDentifier (ID) and a password in a general account authentication method, an input process has to be inconveniently performed whenever an account is authenticated.

SUMMARY OF THE INVENTION

An aspect of the present invention provides a method and apparatus for easily allowing a direct connection between devices via a network, without using a server, by receiving information related to a device to be connected, from a device that pre-stores device information in the network, when a connection history between the devices does not exist.

According to an aspect of the present invention, a method of controlling connection between devices includes detecting a first device, determining whether the first device is included in a device list, obtaining information related to the first device from a second device, and establishing a connection with the first device based on the information from the second device.

According to another aspect of the present invention, a method of controlling connection between devices includes detecting an external device and a first device, determining whether the external device is included in a device list, obtaining authentication information of the external device, and establishing a connection with the external device based on the obtained authentication information of the external device.

According to another aspect of the present invention, an apparatus for controlling connection between devices includes a storage unit for storing a device list, a communication unit for detecting a first device, and a control unit for determining whether the first device is included in the device list, obtaining information related to the first device from a second device via the communication unit, and establishing a connection with the first device based on the information obtained from the second device.

According to another aspect of the present invention, an apparatus for controlling connection between devices includes a storage unit for storing a device list, a communication unit for detecting an external device, and a control unit for determining whether the external device is included in the device list, obtaining authentication information of the external device from the external device via the communication unit, and establishing a connection with the external device based on the obtained authentication information of the external device.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS OF THE INVENTION

Hereinafter, the present invention will be described in detail by explaining various embodiments of the invention with reference to the attached drawings. Like reference numerals in the drawings denote like elements. In the following description of the present invention, a detailed description of known functions and configurations incorporated herein will be omitted for the sake of clarity and conciseness.

Figure 1:
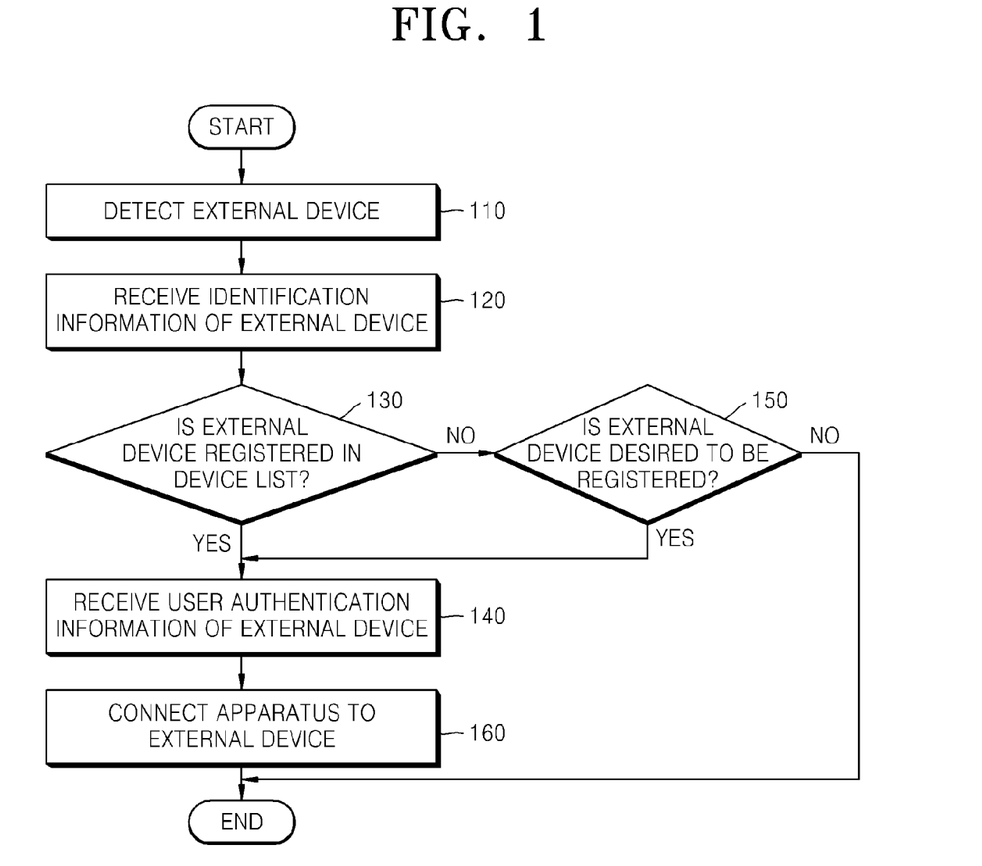
FIG. 1 illustrates a method of controlling connection between devices, according to an embodiment of the present invention.

FIG. 1 illustrates a method of controlling connection between devices, according to an embodiment of the present invention.

Referring to FIG. 1, in step 110, an apparatus for controlling connection between devices detects an external device and attempts to access the external device via a network. Access may be attempted by using a connected Access Point (AP) or by wire. The apparatus detects an external device in a sensing proximity range. When the apparatus detects an external device, the apparatus and the external device are determined as being in the same network, and thus are connected to each other without authenticating accounts, in a manner similar to Digital Living Network Alliance (DLNA) devices.

In step 120, the apparatus receives from the connected external device identification information (e.g., an ID) of the external device. The identification information includes at least one of a Media Access Control (MAC) address of a network module uniquely included in every device, a name for identifying a device in a network, and a model type. However, the identification information is not limited thereto as long as information for identifying the external device is used.

In step 130, the apparatus determines whether the external device is registered in a pre-stored device list based on the received identification information of the external device. The device list includes identification information of at least one external device to be connected, and may be formed as metadata. Examples of the identification information are the same as those of the identification information described above in step 120. The device list may further include authentication information (e.g., a password) for connecting two devices.

The authentication information of an external device includes at least one of a combination of numbers designated by a user of the external device (e.g., 1111), a pattern input (e.g., an input of a line or a figure on a touch panel), and biological information of the user of the external device (e.g., voice or a fingerprint of the user). The apparatus determines whether the received identification information of the external device matches the identification information registered in the device list. If the external device is registered in the device list, the method proceeds to step 140. If the external device is not registered in the device list, the method proceeds to step 150.

In step 140, the apparatus receives user authentication information of the external device. The apparatus receives from the external device the user authentication information of the external device, e.g., a password. When the received user authentication information matches pre-stored user authentication information, the method proceeds to step 160. Alternatively, if the user authentication information of the external device is pre-stored, the apparatus may call the pre-stored user authentication information. In this case, the method directly proceeds to step 160 without checking whether the user authentication information matches pre-stored user authentication information.

In step 150, the apparatus may register the external device. If the external device is desired to be registered, the apparatus registers the external device in the device list based on an input of the user authentication information. If the external device is registered in the device list, the method proceeds to step 140. Otherwise, the method is terminated.

In step 160, the apparatus and the external device are connected to each other.

Figure 2:
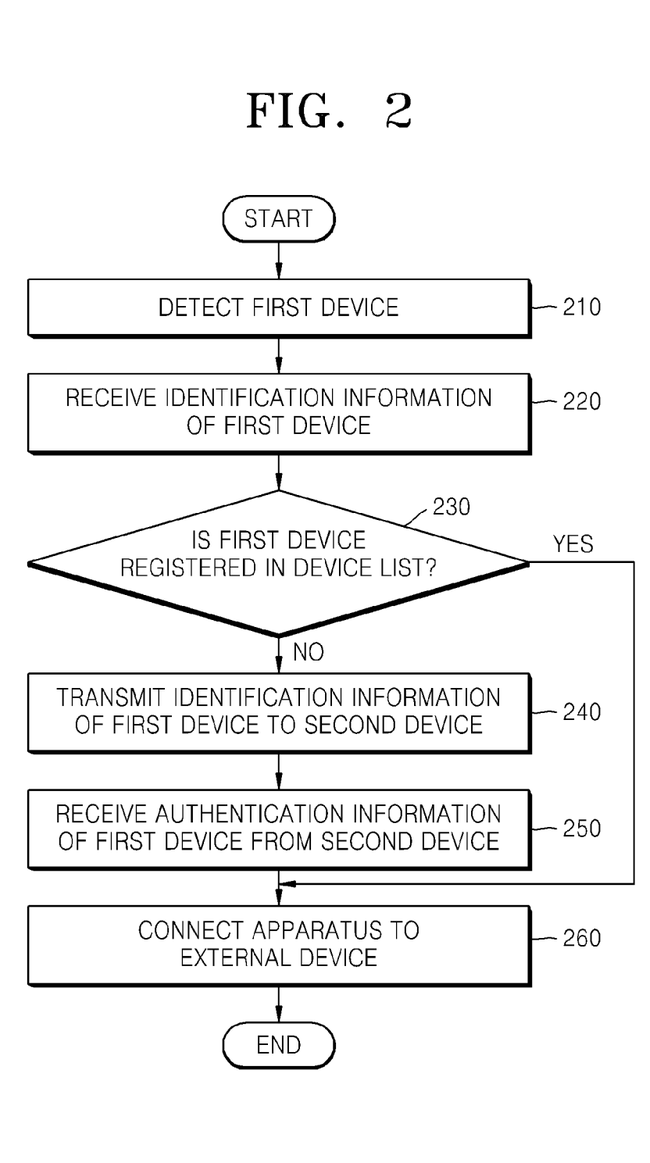
FIG. 2 illustrates a method of controlling connection between devices, according to another embodiment of the present invention.

FIG. 2 illustrates a method of controlling connection between devices, according to an embodiment of the present invention.

Referring to FIG. 2, steps 210 through 230 are similar to steps 110 through 130 illustrated in FIG. 1, and thus will not be described here. The external device in FIG. 1 is described as a first device in FIG. 2. Also, if the first device is registered in a device list, the method proceeds to step 260. Otherwise, the method proceeds to step 240.

An apparatus for controlling connection between devices obtains information related to the first device from a second device that stores the information related to the first device, as described below in steps 240 and 250.

In step 240, if the first device is not registered in the device list, the apparatus transmits identification information of the first device to the second device that stores the information related to the first device. Unlike in FIG. 1, instead of registering the first device, the apparatus requests the second device that stores the information related to the first device, for the information related to the first device. The information related to the first device may be requested by transmitting the received identification information of the first device to the second device. Examples of the identification information of the first device are the same as those of the identification information described above in step 130 of FIG. 1.

In step 250, the apparatus receives authentication information of the first device from the second device. Examples of the authentication information of the first device are the same as those of the authentication information described above in step 130 of FIG. 1. Alternatively, the second device may restrict a device from which or to which the authentication information is transmittable, according to a level of the device. In this case, the second device may not transmit and may restrict the authentication information according to the first device or the apparatus.

In step 260, the apparatus and the first device are connected to each other. If the information related to the first device is obtained from the second device, or if the first device is registered in the device list, the apparatus and the first device are connected to each other.

Figure 3:
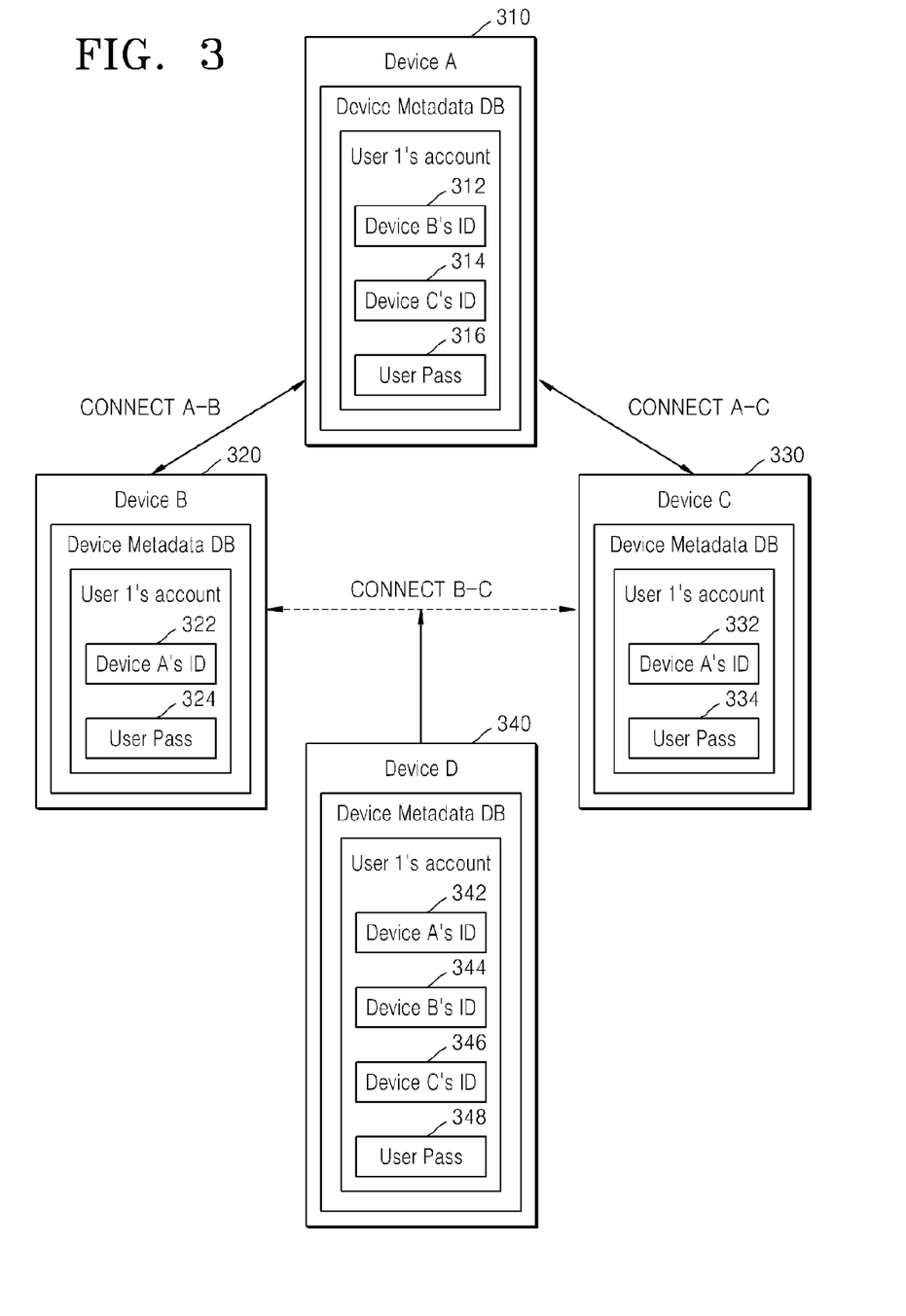
FIG. 3 illustrates a scenario of the method illustrated in FIG. 1 or 2.

FIG. 3 illustrates a scenario of the method illustrated in FIG. 1 or 2.

Referring to FIG. 3, each of devices A 310 through D 340 includes device metadata Data Base (DB) including a device list. The device metadata DB includes user account information including information related to devices to be connected. The user account information may be input by a user.

The device A 310 includes identification information 312 of the device B 320, identification information 314 of the device C 330, and authentication information 316 (i.e. user password or "user pass") of the devices B 320 and C 330. The device B 320 includes identification information 322 and authentication information 324 of the device A 310. The device C 330 includes identification information 332 and authentication information 334 of the device A 310. The device D 340 includes identification information 342 of the device A 310, identification information 344 of the device B 320, identification information 346 of the device C 330, and authentication information 348 of the devices A 310 through C 330.

If the devices A 310 and B 320 are to be connected to each other, since each of the devices A 310 and B 320 includes information related to the other device, the devices A 310 and B 320 are automatically connected to each other without inputting information required for connection. When the devices A 310 and C 330 are to be connected to each other, since each of the devices A 310 and C 330 includes information related to the other device, the devices A 310 and C 330 are automatically connected to each other without inputting information required for connection.

When the devices B 320 and C 330 are to be connected to each other, since each of the devices B 320 and C 330 does not include information related to the other device, the devices B 320 and C 330 are not connected to each other without inputting information required for connection, and have to request the device D 340 that stores information related to the devices B 320 and C 330, for the information related to the devices B 320 and C 330. Then, the devices B 320 and C 330 respectively receive the identification information 346 of the device C 330 and the identification information 344 of the device B 320, and the authentication information 348 of the devices C 330 and B 320, and the device B 320 is automatically connected to the device C 330 or the device C 330 is automatically connected to the device B 320.

Figure 4:
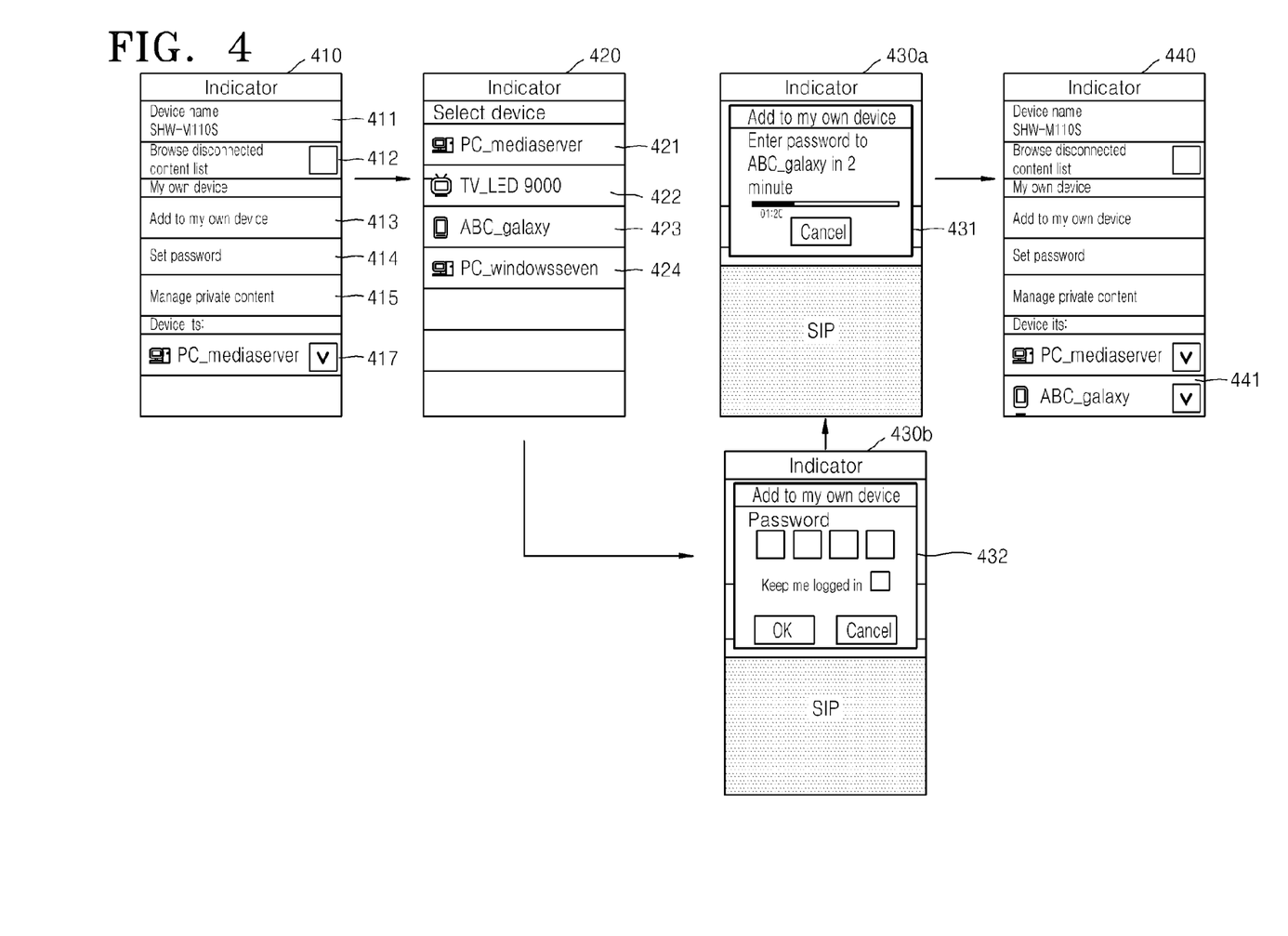
FIG. 4 illustrates images of an interface for registering a device.

FIG. 4 illustrates images of an interface for registering a device.

Referring to FIG. 4, a first interface screen 410 includes an item 411 for displaying the name of a user-owned device (indicated as 'my own' device), an item 412 for displaying contents of a disconnected device, an item 413 for adding a new device to a list of 'my own' devices, an item 414 for setting a password to be used to connect 'my own' device, an item 415 for managing private contents to be shared, and an item 417 for displaying a device registered as 'my own' device.

If a user activates the item 413, a second interface screen 420 is provided. In this case, devices 421 through 424 that are not registered as 'my own' devices from among found devices are displayed on the second interface screen 420.

After that, if the device 423, e.g., ABC_galaxy, is selected to be registered as a 'my own' device, an interface screen 430b for displaying a window 432 for requesting to input a password is provided and, after the password is input, an interface screen 430a for displaying a window 431 showing a registration process is provided. If the user checks "Keep me logged in" on the window 432, the password does not need to be input in the future.

If the registration process is normally performed, an interface screen 440 that is the same as the first interface screen 410 and on which a selected device 441 is registered is provided.

Figure 5:
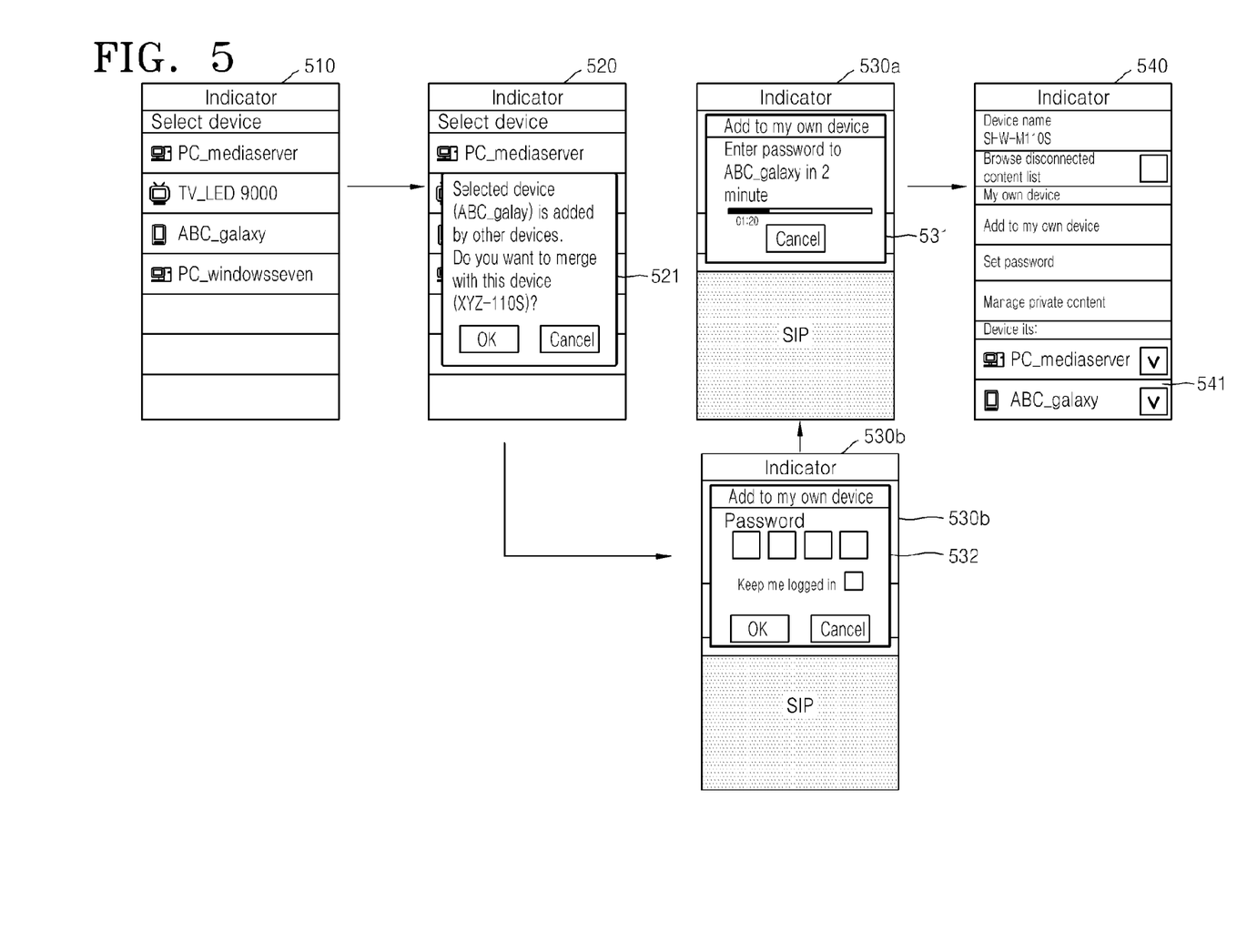
FIG. 5 illustrates images for registering a user-owned device in another device.

FIG. 5 illustrates images for registering a user-owned device in another device.

Referring to FIG. 5, if a user-owned device, e.g., ABC_galaxy, which is to be registered as 'my own' device, is selected on a first interface screen 510, an interface screen 520 for displaying a window 521 for checking whether the selected device is to be registered in another device, e.g., XYZ-110S, is provided. In FIG. 5, the other device is the same as the device D 340 illustrated in FIG. 3.

If a user selects an OK button, interface screens 530a, 530b, and 540 that are the same as the interface screens 430a, 430b, and 440 illustrated in FIG. 4 are provided.

Figure 6:
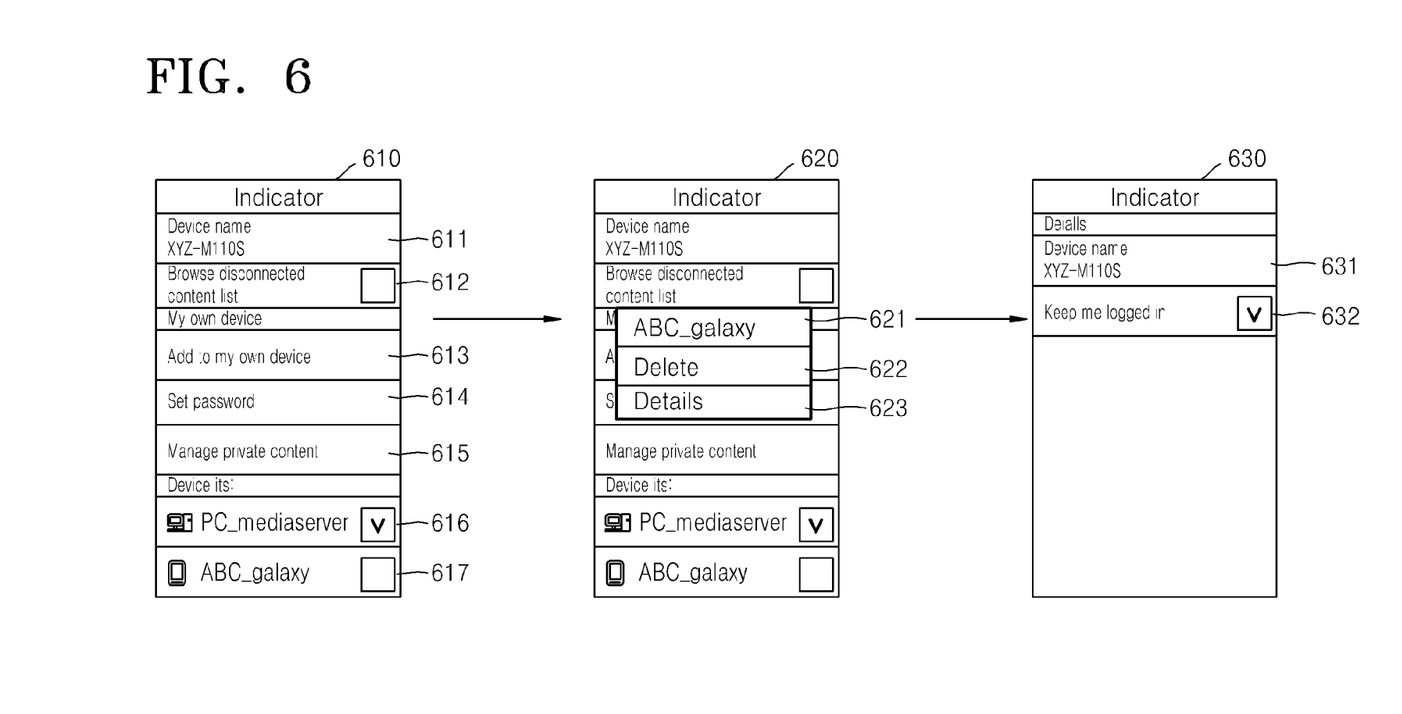
FIG. 6 illustrates images for checking the state of a device registered as a user-owned device.

FIG. 6 illustrates images for checking the state of a device registered as a user-owned device.

Referring to FIG. 6, an interface screen 610 that is the same as the first interface screen 410 illustrated in FIG. 4 is provided. When a user selects a device 617 that is currently registered as a user-owned, i.e., 'my own', device, e.g., ABC_galaxy, an interface screen 620 for displaying a window 621 showing the state of ABC_galaxy is provided. The window 621 includes an item 622 for deleting a device and an item 623 for checking detailed information. If the user selects the item 622, the selected device 617 is deleted from a list of 'my own' devices. If the user selects the item 623, an interface screen 630 for displaying detailed information is provided. The interface screen 630 includes an item 631 for displaying the name of a device and an item 632 for checking "Keep me logged in" that allows connection without inputting a password in the future.

Figure 7:
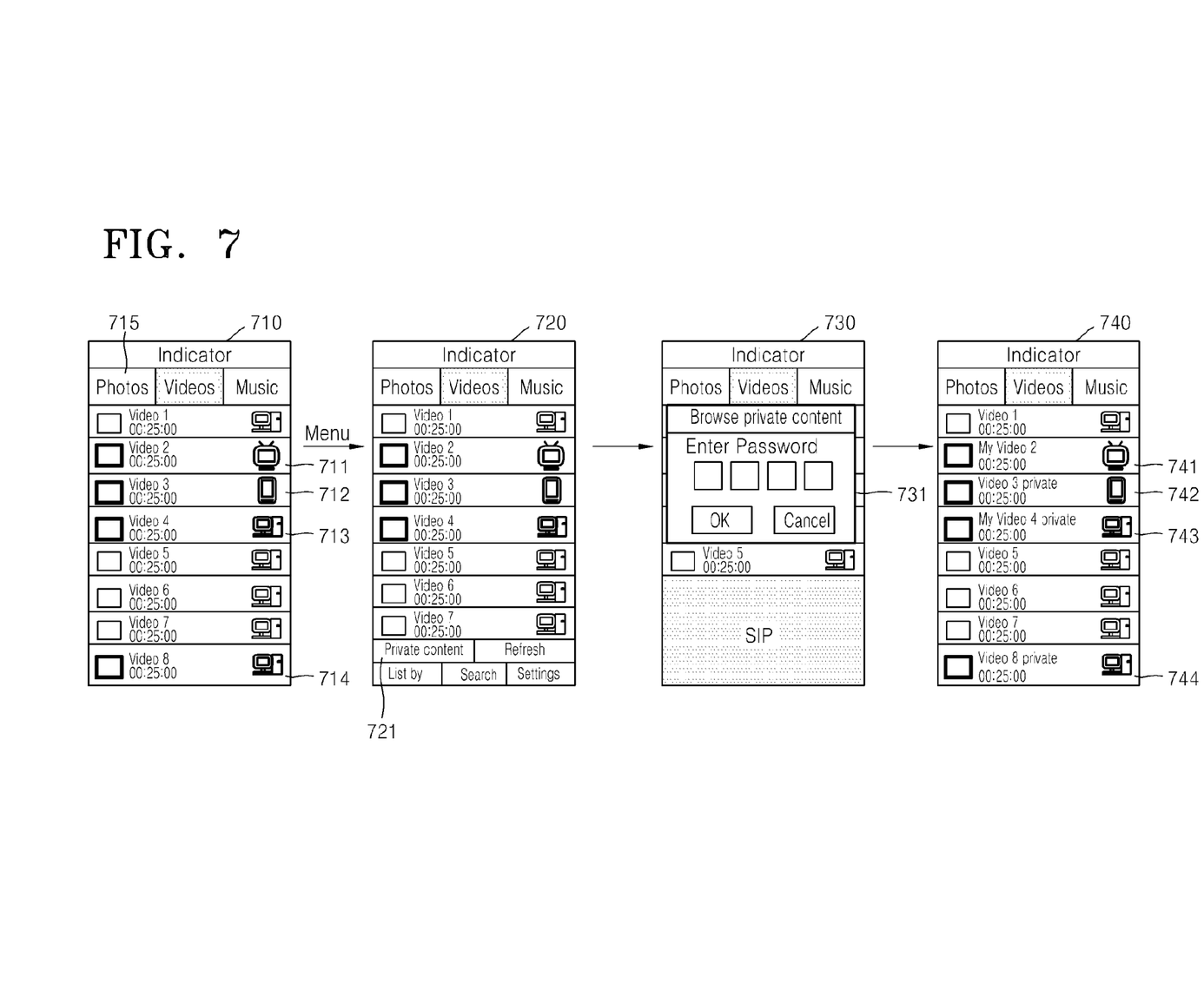
FIG. 7 illustrates images showing an integrated list of contents in connected devices.

FIG. 7 illustrates images showing an integrated list of contents in connected devices.

Referring to FIG. 7, a first interface screen 710 displays an item 715 for displaying content types, contents, and devices storing the contents and registered as user-owned, i.e., 'my own' devices. Current connected devices 711 through 714 may be displayed in bold type. If an item 721 for displaying private contents is selected on a second interface screen 720, an interface screen 730 for displaying a window 731 for requesting to input a password is provided. If the password is input, contents 741 through 744 of the connected devices are integrated.

Figure 8:
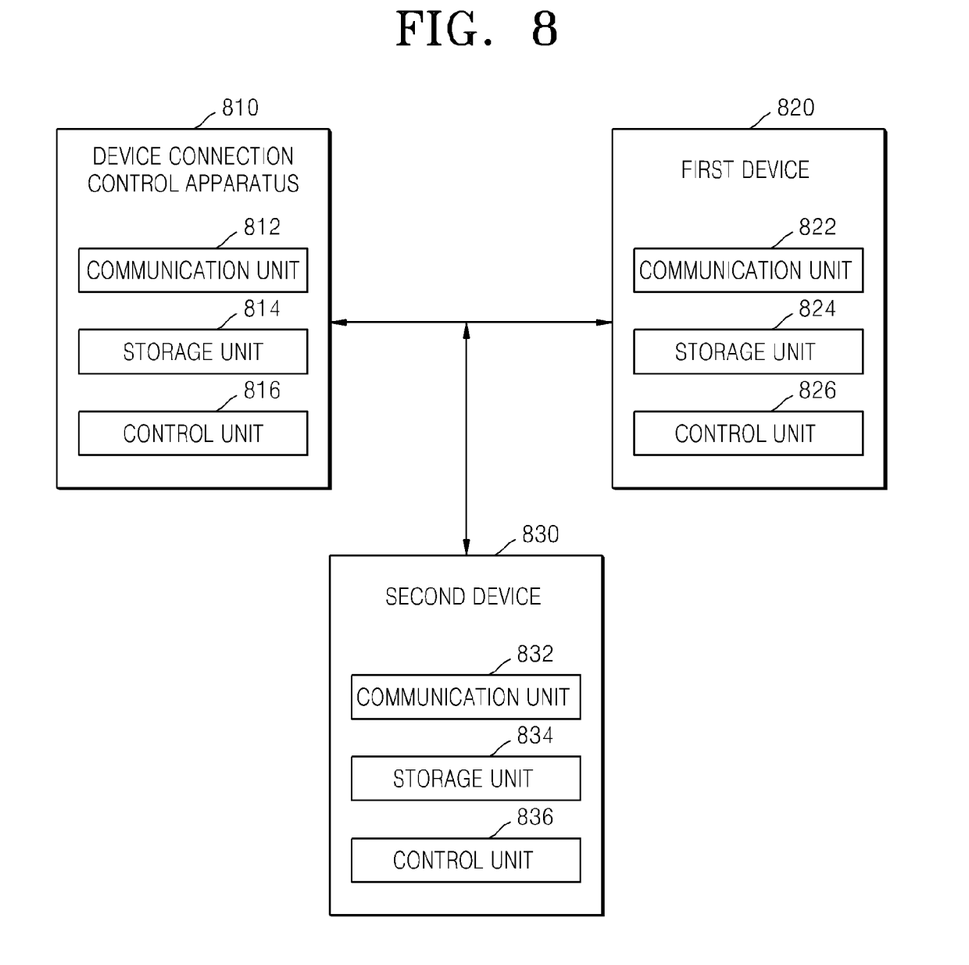
FIG. 8 illustrates an apparatus for controlling connection between devices, and the devices to be connected, according to an embodiment of the present invention.

FIG. 8 illustrates a device connection control apparatus 810 for controlling connection between first and second devices 820 and 830, and the first and second devices 820 and 830 to be connected, according to the present invention.

Referring to FIG. 8, the device connection control apparatus 810 includes a communication unit 812, a storage unit 814, and a control unit 816, the first device 820 includes a communication unit 822, a storage unit 824, and a control unit 826, and the second device 830 includes a communication unit 832, a storage unit 834, and a control unit 836.

First Example

A first example is related to controlling a connection between the apparatus 810 and the first device 820.

The communication unit 812 of the apparatus 810 detects the first device 820 and attempts to access the first device 820 via a network by using a connected AP or by wire. The communication unit 812 of the apparatus 810 detects the first device 820 in a sensing proximity range. If the communication unit 812 of the apparatus 810 detects the first device 820, the apparatus 810 and the first device 820 are determined as being in the same network, and thus are connected to each other without authenticating accounts, such as in a manner similar to DLNA devices.

The communication unit 812 of the apparatus 810 then receives from the connected first device 820 identification information (e.g., an ID) of the first device 820. The identification information includes at least one of a MAC address of a network module uniquely included in every device, a name for identifying a device in a network, and a model type. However, the identification information is not limited thereto as long as information for identifying the first device 820 is used.

The storage unit 814 of the apparatus 810 pre-stores a device list of external devices. The device list includes identification information of at least one external device to be connected, and may be formed as metadata. Examples of the identification information are the same as those of the identification information described above. Also, the device list may further include authentication information (e.g., a password) for connecting two devices.

The authentication information of an external device includes at least one of a combination of numbers designated by a user of the external device (e.g., 1111), a pattern input (e.g., an input of a line or a figure on a touch panel), and biological information of the user of the first device 820 (e.g., voice or a fingerprint of the user). The control unit 816 of the apparatus 810 determines whether the first device 820 is registered in the device list stored in the storage unit 814 of the apparatus 810, based on received identification information of the first device 820. The control unit 816 of the apparatus 810 determines whether the received identification information of the first device 820 matches the identification information registered in the device list. If the first device 820 is registered in the device list, the communication unit 812 of the apparatus 810 receives user authentication information of the first device 820. The communication unit 812 of the apparatus 810 receives from the first device 820 the user authentication information of the first device 820, e.g., a password.

When the received user authentication information matches pre-stored user authentication information, the apparatus 810 and the first device 820 are connected to each other. When the user authentication information of the first device 820 is pre-stored in the storage unit 814 of the apparatus 810, the control unit 816 of the apparatus 810 may call the pre-stored user authentication information. In this case, the apparatus 810 and the first device 820 are connected to each other without checking whether the user authentication information matches pre-stored user authentication information.

If the first device 820 is not registered in the device list, the control unit 816 of the apparatus 810 may register the first device 820. If the first device 820 is desired to be registered, the control unit 816 of the apparatus 810 registers the first device 820 in the device list stored in the storage unit 814 of the apparatus 810 based on an input of the user authentication information.

When the apparatus 810 and the first device 820 are connected to each other, their functions may be switched according to which device attempts to access the other device.

Second Example

A second example is related to controlling a connection between the apparatus 810 and the first device 820.

The communication unit 812 of the apparatus 810 detects the first device 820. The communication unit 812 of the apparatus 810 attempts to access the first device 820 via a network. According to an embodiment of the present invention, the communication unit 812 of the apparatus 810 may attempt access by using a connected AP or by wire. The communication unit 812 of the apparatus 810 detects the first device 820 in a sensing proximity range. If the communication unit 812 of the apparatus 810 detects the first device 820, the apparatus 810 and the first device 820 are determined as being in the same network, and thus are connected to each other without authenticating accounts similarly to, for example, DLNA devices.

The communication unit 812 of the apparatus 810 then receives from the connected first device 820 identification information (e.g., an ID) of the first device 820. The identification information includes at least one of a MAC address of a network module uniquely included in every device, a name for identifying a device in a network, and a model type. However, the identification information is not limited thereto as long as information for identifying the first device 820 is used.

The storage unit 814 of the apparatus 810 pre-stores a device list of external devices. The device list includes identification information of at least one external device to be connected, and may be formed as metadata. Examples of the identification information are the same as those of the identification information described above. Also, the device list may further include authentication information (e.g., a password) for connecting two devices. The authentication information of an external device includes at least one of a combination of numbers designated by a user of the external device (e.g., 1111), a pattern input (e.g., an input of a line or a figure on a touch panel), and biological information of the user of the first device 820 (e.g., voice or a fingerprint of the user).

The control unit 816 of the apparatus 810 determines whether the first device 820 is registered in the device list stored in the storage unit 814 of the apparatus 810, based on received identification information of the first device 820. The control unit 816 of the apparatus 810 determines whether the received identification information of the first device 820 matches the identification information registered in the device list. If the first device 820 is registered in the device list, the apparatus 810 and the first device 820 are connected to each other.

If the first device 820 is not registered in the device list stored in the storage unit 814 of the apparatus 810, the apparatus 810 obtains information related to the first device 820 from the second device 830 that stores the information related to the first device 820. Specifically, the communication unit 812 of the apparatus 810 transmits identification information of the first device 820 to the communication unit 832 of the second device 830 including the storage unit 834 that stores the information related to the first device 820. Unlike the first example, instead of registering the first device 820, the apparatus 810 requests the second device 830 that stores the information related to the first device 820, for the information related to the first device 820.

The communication unit 812 of the apparatus 810 may request the information related to the first device 820 by transmitting the received identification information of the first device 820 to the second device 830.

The communication unit 812 of the apparatus 810 then receives authentication information of the first device 820 from the communication unit 832 of the second device 830. The control unit 836 of the second device 830 may restrict a device from or to which the authentication information is transmittable, according to a level of the device. In this case, the second device 830 may not transmit and may restrict the authentication information according to the first device 820 or the apparatus 810.

The control unit 816 of the apparatus 810 and the first device 820 are then connected to each other.

Embodiments of the present invention can also be implemented as computer-readable code on a computer-readable recording medium. The computer-readable recording medium is any data storage device that can store data, which can be thereafter read by a computer system. Examples of the computer-readable recording medium include Read-Only Memory (ROM), Random-Access Memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments for accomplishing the present invention may be easily construed by programmers of ordinary skill in the art.

While the present invention has been particularly shown and described with reference to embodiments thereof, it will be understood by one of ordinary skill in the art that various changes in form and details may be made therein without departing from the spirit and scope of the invention as defined by the following claims. The embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A method of controlling connection between electronic devices, the method comprising:
   detecting a first device;
   determining whether the first device is included in a device list;
   when the first device is not included in the device list, requesting a second device for authentication information related to the first device;
   obtaining the authentication information related to the first device from the second device, the second device storing the authentication information related to the first device; and establishing a connection with the first device based on the authentication information related to the first device from the second device.

2. The method of claim 1, wherein detecting the first device comprises:
   detecting an existence of the first device within a sensing proximity; and
   receiving identification information of the first device.

3. The method of claim 2, wherein obtaining the authentication information related to the first device from the second device comprises:
   transmitting the identification information of the first device to the second device; and
   obtaining the authentication information of the first device from the second device.

4. The method of claim 2, wherein the identification information of the first device comprises at least one of a Media Access Control (MAC) address, a name, and a model type of the first device.

5. The method of claim 3, wherein the authentication information of the first device comprises at least one of a combination of numbers designated by a user of the first device, a pattern input, and biological information of the user of the first device.

6. The method of claim 3, wherein obtaining the authentication information of the first device from the second device comprises selectively obtaining the authentication information of the first device according to a selection level of the second device.

7. A method of controlling connection between devices, the method comprising:
   detecting an external device;
   determining whether the external device is included in a device list;
   when the external device is not included in the device list, obtaining authentication information of the external device from a second device, the second device storing the authentication information of the external device; and
   establishing a connection with the external device based on the obtained authentication information of the external device.

8. The method of claim 7, wherein detecting the external device comprises:
   detecting an existence of the external device within a sensing proximity; and
   receiving identification information of the external device.

9. The method of claim 8, wherein the identification information of the external device comprises at least one of a Media Access Control (MAC) address, a name, and a model type of the external device.

10. The method of claim 8, wherein the authentication information of the external device comprises at least one of a combination of numbers designated by a user of the external device, a pattern input, and biological information of the user of the external device.

11. An apparatus for controlling connection between devices, the apparatus comprising:
   a storage unit for storing a device list;
   a communication unit for detecting a first device; and
   a control unit for determining whether the first device is included in the device list, when the first device is not included in the device list, requesting a second device for authentication information related to the first device, obtaining the authentication information related to the first device from the second device via the communication unit, the second device storing the authentication information related to the first device, and establishing a connection with the first device based on the authentication information related to the first device obtained from the second device.

12. The apparatus of claim 11, wherein the communication unit detects an existence of the first device within a sensing proximity, and receives identification information of the first device.

13. The apparatus of claim 12, wherein the communication unit transmits the identification information of the first device to the second device, and obtains the authentication information of the first device from the second device.

14. The apparatus of claim 12, wherein the identification information of the first device comprises at least one of a Media Access Control (MAC) address, a name, and a model type of the first device.

15. The apparatus of claim 13, wherein the authentication information of the first device comprises at least one of a combination of numbers designated by a user of the first device, a pattern input, and biological information of the user of the first device.

16. An apparatus for controlling connection between devices, the apparatus comprising:
   a storage unit for storing a device list;
   a communication unit for detecting an external device; and
   a control unit for determining whether the external device is included in the device list, when the external device is not included in the device list, obtaining authentication information of the external device from a second device via the communication unit, the second device storing the authentication information of the external device, and establishing a connection with the external device based on the obtained authentication information of the external device.

17. The apparatus of claim 16, wherein the communication unit detects an existence of the external device within a sensing proximity, and receives identification information of the external device.

18. The apparatus of claim 17, wherein the identification information of the external device comprises at least one of a Media Access Control (MAC) address, a name, and a model type of the external device.

19. The apparatus of claim 16, wherein the authentication information of the external device comprises at least one of a combination of numbers designated by a user of the external device, a pattern input, and biological information of the user of the external device.

20. A non-transitory computer-readable recording medium having recorded thereon a program for executing a method of controlling connection between devices, the method comprising:
   detecting a first device;
   determining whether the first device is included in a device list;
   when the first device is not included in the device list, requesting a second device for authentication information related to the first device;
   obtaining the authentication information related to the first device from the second device, the second device storing the authentication information related to the first device; and
   establishing a connection with the first device based on the authentication information related to the first device from the second device.

21. A non-transitory computer-readable recording medium having recorded thereon a program for executing a method of controlling connection between devices, the method comprising:
   detecting an external device;
   determining whether the external device is included in a device list;
   when the external device is not included in the device list, obtaining authentication information of the external device from a second device, the second device storing the authentication information of the external device; and
   establishing a connection with the external device based on the obtained authentication information of the external device.

\* \* \* \* \*